March 19, 1963 E. A. SALERA 3,081,628
FLUID FLOW RATE DETECTION APPARATUS
Filed Sept. 19, 1960 2 Sheets-Sheet 1
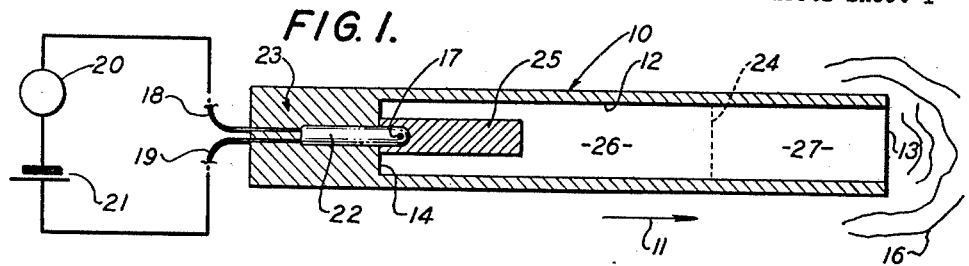
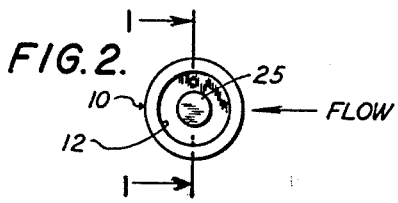 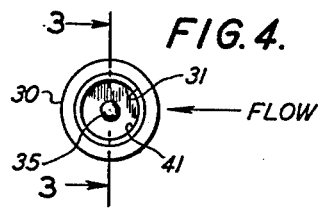
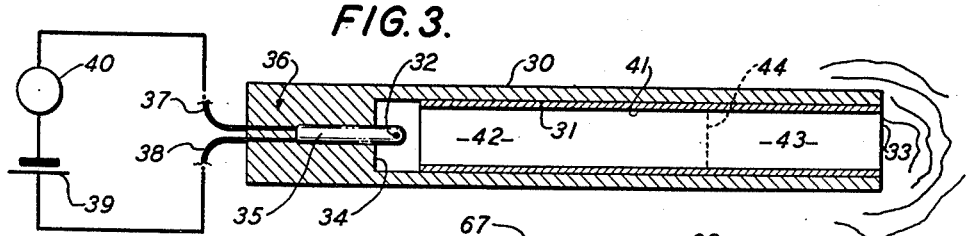
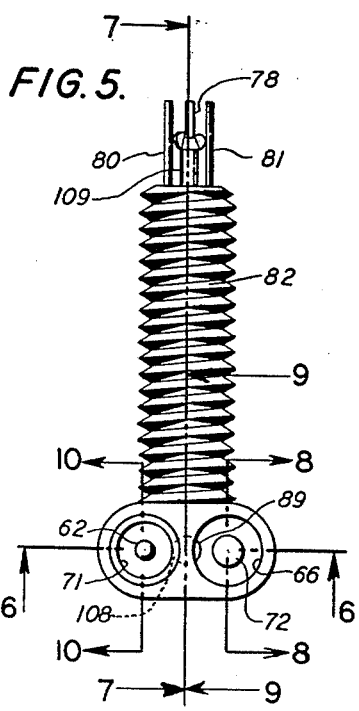 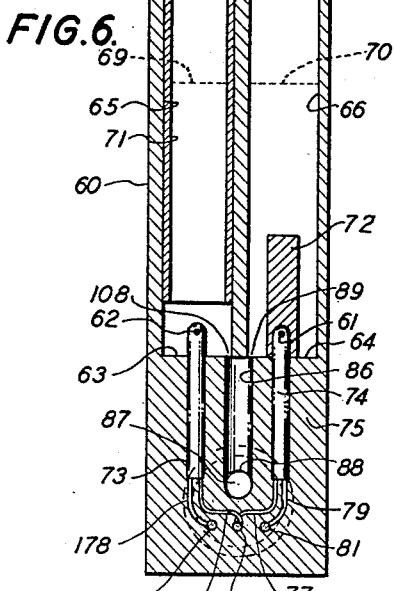
INVENTOR.
EDMOND A. SALERA
BY *White & Haefliger*
ATTORNEYS March 19, 1963  E. A. SALERA  3,081,628
FLUID FLOW RATE DETECTION APPARATUS
Filed Sept. 19, 1960  2 Sheets-Sheet 2
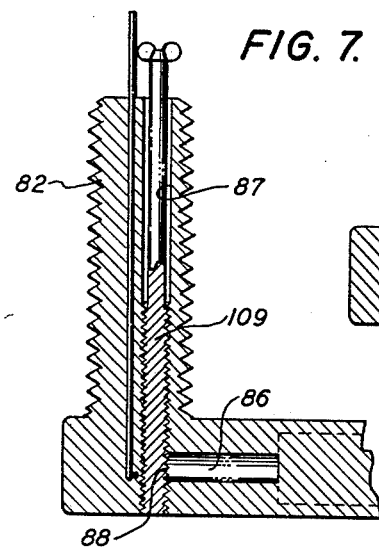
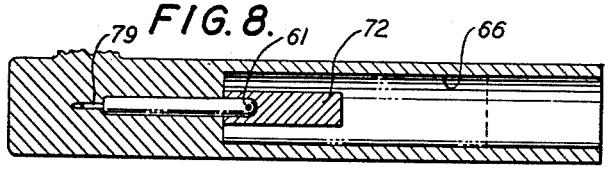
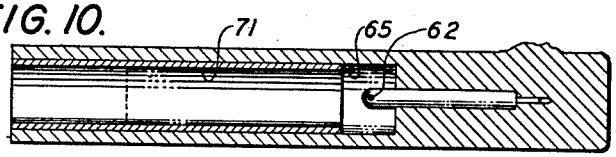
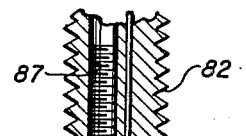
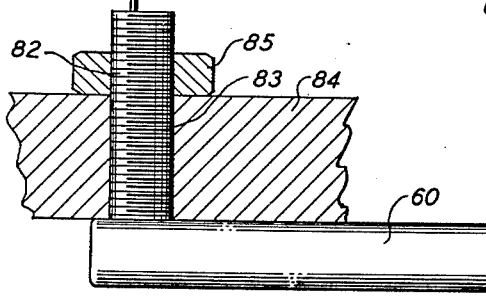
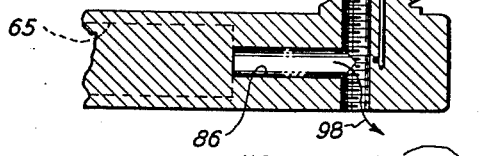
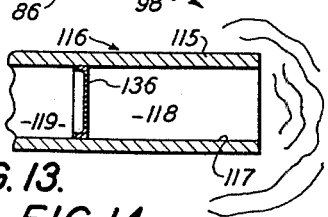
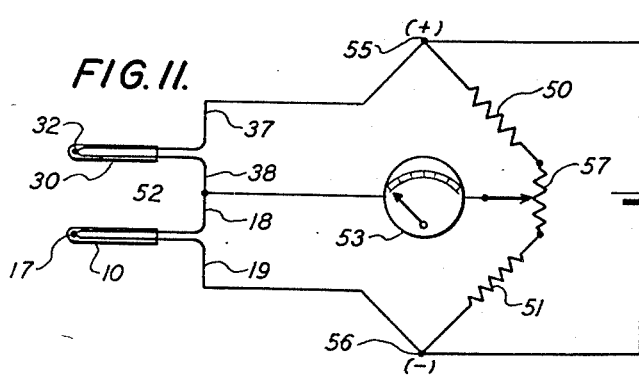
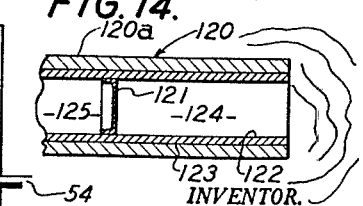
INVENTOR.
EDMOND A. SALERA
BY
ATTORNEYS

United States Patent Office 3,081,628
Patented Mar. 19, 1963

3,081,628
FLUID FLOW RATE DETECTION APPARATUS
Edmond A. Salera, 714 Surf View Drive,
Santa Barbara, Calif.
Filed Sept. 19, 1960, Ser. No. 56,709
10 Claims. (Cl. 73—204)

This invention relates generally to devices for sensing fluid temperature, and more particularly concerns novel instrumentation operable through fluid temperature sensing to measure relative motion of a fluid medium with respect to such instrumentation.

It is a major object of the invention to provide an improved device or instrument for measuring with high accuracy the rate of fluid flow relative to the device during immersion of the latter in a body of fluid. Advantageous applications of the device include its use as a flow meter, as for example a speed sensor on water craft, and use in fluid pipelines for measuring the rate of fluid flow therethrough. These are only illustrative examples of applications of the invention, there being many more which those skilled in the art will recognize.

The invention is also directed to the provision of novel components or elements of a flow meter which may have individual use for detecting or sensing fluid temperature conditions as well as combination use in a flow meter. Accordingly, these separate elements of the novel flow meter will be discussed preliminarily to the disclosure of their combination use in a flow meter.

In connection with the provision of the novel components mentioned, it is another major object of the invention to supply the need for a small, inexpensive electrical device which will accurately sense the temperature of a fluid medium having motion relative to the device. As broadly contemplated, the instrumentality comprises electrically energizable means, typically but not necessarily a thermistor, having impedance that varies with temperature, to be supported on a particular type body that is submersible in the fluid medium under conditions such that the fluid medium has motion relative to the body. In particular, the body forms a cavity for holding substantially undisturbed fluid in such proximity to the relative motion fluid and to the electrical means that the temperature of the relative motion is referred to the electrical means through the undisturbed fluid. Of advantage here is the result that only the temperature and not the relative flow of the fluid medium is effective upon the impedance of the electrical means, since the relative motion fluid does not have access to the electrical means. If such access exists, the relative flow of the fluid rapidly draws heat from the electrical means and changes its impedance to an extent such that temperature measurement is not possible because of the lack of super-position of temperature sensing and flow sensing.

A second novel component and element of the combination flow meter instrument provides for a desired condition of superposition of temperature sensing and flow sensing. This device is similar to the temperature sensing component mentioned, with the exception that thermally conductive means is carried by the body to extend in such proximity to the undisturbed fluid and the electrical means and also to the relative motion fluid, that flow variations of the relative motion fluid affect the rate of heat transfer between the electrical means and relative motion fluid and through the undisturbed fluid and thermally conductive means. It will be noted at this point that the effect on the electrical means, as for example a thermistor, is felt by the electrical means through the undisturbed fluid and not independently thereof, thereby setting up a superposition condition of temperature effect and fluid flow rate effect on the thermistor impedance. As a result, the combination instrument embodying both of the components described is enabled, when electrically connected in an appropriately balanced circuit, to cancel the temperature sensing effect thereby to derive absolute flow rate measurement.

These and other objects and advantages of the invention will be further understood from the following detailed description in which FIG. 1 is an enlarged elevation in section through the so-called temperature reference unit;

FIG. 2 is an end view of the FIG. 1 unit;

FIG. 3 is an enlarged side elevation taken in section through a so-called flow sensing unit;

FIG. 4 is an end view of the FIG. 3 unit;

FIG. 5 is an end elevation of the flow meter assembly in which the FIG. 1 and FIG. 3 units are combined;

FIG. 6 is a section taken on line 6—6 of FIG. 5;

FIG. 7 is a fragmentary section taken on line 7—7 of FIG. 5;

FIG 8 is a fragmentary section taken on line 8—8 of FIG. 5;

FIG. 9 is a fragmentary section taken on line 9—9 of FIG. 5;

FIG. 10 is a fragmentary section taken on line 10—10 of FIG. 5;

FIG. 11 is a circuit diagram showing the interconnection of the flow and reference units of FIG. 5;

FIG. 12 is a fragmentary view, partly in section, showing the application of the device to a water craft; and FIGS. 13 and 14 are fragmentary views of the end portions of modified temperature reference and flow sensing units.

In FIG. 1 the reference unit shown includes a body 10 made of heat insulating material such as plastic or ceramic, and which is forwardly elongated in the direction of the arrow 11. The body contains a cavity which preferably takes the form of a cylindrical recess 12 which is elongated in the direction of the arrow 11 between the recessed mouth 13 and the closed end 14 of the recess.

The body 10 is adapted to be submerged in a fluid medium under conditions such that the medium has motion relative to the body, as indicated by the flow lines 16 showing rearward flow of fluid over the body exterior. In this connection, it will be understood that the body may be motionless relative to the earth with fluid having motion over the body as in a pipeline, or the body 10 may be moving through still fluid, or a combination of these conditions may exist.

The body 10 supports an electrical means shown at 17 which preferably but not necessarily comprises what is known as a thermistor, characterized in that it has impedance that varies with temperature. In the case of the thermistor its resistance changes as the temperature of the thermistor changes, so that current flow through the thermistor, its leads 18 and 19, and through an ammeter 20, can be calibrated in terms of temperature. The supply voltage is shown as supplied by a battery 21 and as long as such voltage remains constant the current flow will be determined only by the absolute temperature of the thermistor. As shown in FIG. 1, the thermistor is indirectly carried by the body 10 in view of its intermediate carriage by probe 22 received within the closed end section 23 of the body 10.

Further in connection with the recess 12, it will be noted that the length thereof between the recess mouth 13 and the thermistor location is sufficient that during the submergence conditions of operation fluid is received within the recess and a shock wave develops somewhere within the fluid in the recess to separate turbulent relative motion fluid forward of the shock wave from substantially undisturbed barrier fluid rearward of the shock wave. As illustrated in FIG. 1 a pressure interface is indicated by the broken line 24 extending transversely across the recess forward of the thermistor 17 and also forward of a heat sink means designated at 25 in which the thermistor is embedded. The block 25 is sized to damp out slight temperature conditions of barrier fluid in different regions of the zone 26 rearward of the interface 24. The turbulent fluid zone forward of the shock wave is designated at 27. The heat sink block 25 may comprise a thermally conductive material.

In operation, all of the fluid within the recess 12 has temperature the same or almost the same as the fluid medium outside the body 10 and accordingly the block 25 has this same temperature, which is referred to the thermistor. At the same time, while the temperature of the relative motion fluid is accurately referred to the thermistor there is no steady drainage of heat from the thermistor to the relative motion fluid due to the presence of the barrier undisturbed fluid within the zone 26. Accordingly, calibrated meter 20 reads the temperature of the relative motion fluid.

Among the additional advantages of the device shown in FIG. 1 is the property of being anti-fouling, which is derived from the tendency of the shock front at the mouth of the tube to deflect any particles of extraneous matter and prevent entrance of such matter into the recess 12.

Referring now to FIG. 3, the so-called flow unit shown therein is dimensioned the same as the FIG. 1 unit as to the length and width of the body 30 the length and width of the recess 31 and the position of the thermistor 32 within the recess 31, particularly as respects the recessed mouth location 33 and the recess closed end 34. Here again the thermistor is carried by a probe 35 extending within the closed end section 36 of the body 30 and the thermistor leads 38 and 37 are connected into a series circuit that includes a battery 39 and a current meter 40.

Instead of the heat sink means 25, there is provided in FIG. 3 a thermally conductive means which may typically but not necessarily comprise a metal liner 41, which is carried by the body 30 in such a way as to extend in proximity to the thermistor 32, to the barrier relatively quiescent fluid within the recess zone 42, and to the relative motion fluid within the recess zone 43. The latter two zones are separated by the pressure interface 44 extending transversely across the recess. Furthermore, the proximity of the thermally conductive means, as for example the liner 41, to the fluid in these zones and to the thermistor is such that flow variations of the relative motion fluid change the rate of heat transfer between the electrical means and the relative motion fluid, such heat transfer taking place through the undisturbed fluid and through the thermally conductive means 41. Accordingly, the metal liner 41 may be said to loosely couple the heat from the self-heated thermistor 32 to the turbulent or relative motion fluid in the forward zone 43. Such loose coupling is created by indirect heating of the liner by the thermistor through the barrier relatively quiescent fluid within the zone 42, there being a space or gap between the thermistor and the liner 41 which space is occupied by the barrier relatively quiescent fluid. These conditions establish the desired superposition as respects the effects of heat reference from the relative motion fluid to the thermistor through the relatively quiescent fluid, and heat transfer from the thermistor through the relatively quiescent fluid and the liner 41 to the relative motion fluid.

The metal liner 41 conducts heat away from the undisturbed zone 42 in proportion to the amount of turbulence in the zone 43 until a condition of equilibrium in the metal liner has been achieved. Upon a change of turbulence in the forward area of zone 43 which increases or decreases in accordance with the velocity of the fluid passing over the mouth 33 of the tube or body 30, the equilibrium condition in the liner 41 is unbalanced to the degree that a new state of equilibrium must be established by the liner in accordance with the new conditions posed by the turbulence zone. The equilibrium of the metal liner influences the equilibrium of the thermistor by the loose coupling through the undisturbed fluid in zone 42, and these effects govern changes in the wattage dissipation of the thermistor. Changing the wattage dissipation of the thermistor varies the changeable parameters of the thermistor including its resistance. The loose coupling achieved by the quiet fluid in zone 42 makes possible shifting of the equilibrium point of the thermistor in accordance with the effects of changing turbulence taking place at any instant within the turbulent zone 43, as opposed to close coupling of the thermistor wherein the equilibrium point of the thermistor cannot be changed to any great extent. Close coupling occurs in FIG. 1 unit wherein the thermistor is not affected by changing flow rates.

Referring now to FIG. 11, the bodies and thermistors of the FIG. 1 and FIG. 3 units are designated by the same numbers as used previously, the units themselves being schematically shown. The reference and flow units are furthermore interconnected in a Wheatstone bridge circuit as illustrated for purposes of measuring changes in fluid velocity. In particular, one resistance leg of the bridge circuit is shown at 50 as being connected with the lead 37 of the flow unit, and another resistance leg 51 of the circuit is connected with the lead 19 of the reference unit. The other leads 18 and 38 of the reference and flow units are interconnected at the common connection 52 to which one side of the indicating meter 53 is also connected. The constant voltage power supply to the bridge circuit is shown at 54 as being connected at points 55 and 56 between the resistance leg 50 and thermistor lead 37, and between resistance leg 51 and thermistor lead 19 respectively. A potentiometer slide wire is shown at 57 as being connected with the resistances 50 and 51, the wiper being connected with the opposite side of the indicating meter 53.

In operation, the indicating meter 53 reads fluid flow rates unaffected by changes in ambient temperature within the fluid, the meter being suitably calibrated. This result is possible because of the ambient temperature sensing ability of each of the flow and reference units, the impedance changes of the thermistors, of the two units due to temperature reference being cancelled out in the bridge circuit.

Referring now to FIGS. 5 through 10, a combination flow meter construction is shown characterized in that one body 60 carries both of the thermistors 61 and 62. These thermistors are located near the rearward closed ends 63 and 64 of the forwardly elongated parallel recesses 65 and 66 terminating at mouths 67 and 68, these recesses being of sufficient length as to favor the establishment of pressure interfaces 69 and 70 forward of the thermistors. A metal liner 71 like that shown in FIG. 3 is carried within the recess 65 and a heat sink body or block 72 is carried within the recess 66 in the same manner as the heat sink shown at 25, in FIG. 1.

The two thermistors 61 and 62 are carried by probes 73 and 74 mounted within the solid section 75 of the body 60. The leads 76 and 77 of the thermistors are connected to a common terminal 78, whereas the leads 78 and 79 of the two thermistors are connected to separate terminals 80 and 81. All three terminals 78, 80 and 81 extend lengthwise through a threaded post 82 to project beyond the terminal end of the post, so as to be accessible for connection to the remainder of the bridge circuit shown in FIG. 11. Accordingly, such connection may be very conveniently made within a boat or water craft to which the flow meter is connected as shown in FIG. 12. The threaded post 82 is therein illustrated as extending through a threaded opening 83 in the boat hull 84, a nut 85 threaded on the post 82 holding the post connected to the hull. The body 60 is therefore positioned next to the hull for sensing flow and temperature as previously described.

Finally, it will be seen in FIGS. 6, 7 and 9 that a pair of ports 86 and 87 are formed in the body to intersect at the location 88. Port 86 communicates with the rearward ends of the recesses 65 and 66 at the locations 108 and 89 in order that the ports may receive fluid circulation from the recesses whenever desired. Such circulation is only desired at the beginning of operation of the flow meter in order to remove air bubbles and other matter from the recess interiors, such bubbles and foreign matter flowing outwardly as indicated by the arrow 98 in FIG. 9. After flushing of this material from the recesses the port 86 is closed as by screwing the threaded stem 109 downwardly through the port 87 and across the port 86. This stem is shown in FIG. 7 as blocking the part 86, whereas the stem is removed from the port 87 in FIG. 9.

In FIG. 13 the front portion of the tubular body 115 of a modified temperature reference unit 116 is shown to contain a diaphragm 136 of heat conductive material extending across the body bore 117. In all other respects, the reference unit 116 is like the reference unit of FIG. 1. The diaphragm, which may comprise metal, acts as a "window" for purposes of referring the temperature of the relative motion fluid in the turbulent zone 118, to the undisturbed fluid in zone 119, for alternate reference to the thermistor, not shown. Accordingly, no bubbles can form in zone 119 and there is no pressure interface formation in the tube 115 in view of the forward placement of the diaphragm 136.

In FIG. 14 the front portion of the body 120a of a modified flow sensing unit 120 is shown to contain a diaphragm 121 of heat conductive material extending across the bore 122 of metal liner 123. The latter is like liner 41 of FIG. 3, and in all other respects the unit 120 is like the flow sensing unit of FIG. 3. The diaphragm, which may comprise metal, acts as a "window" for purposes of referring the temperature of the relative motion fluid in the turbulent zone 124 to the undisturbed fluid in zone 125, for ultimate reference to the thermistor now shown. Accordingly, no bubbles can form in zone 125, and there is no pressure interface formation in the bore 122 in view of the forward placement of the diaphragm 121.

In both the FIG. 13 and FIG. 14 devices, the diaphragms 136 and 121 prevent fouling and clogging of the tubular bodies, the water in the turbulent zones 118 and 124 carrying away particles of extraneous matter. Also, the open ends of the bodies 115 and 120a need not face forwardly into the relatively rearwardly flowing water or fluid, since no pressure interfaces need be developed within the tubular bodies.

I claim:

1. Apparatus for sensing relative motion of a fluid medium, comprising electrically energizable means having impedance that varies with temperature, body means exposable to the fluid medium under conditions such that the fluid medium has motion relative to said body means, said body means supporting said electrical means and forming a cavity for holding substantially undisturbed fluid in such proximity to the relative motion fluid and said electrical means that temperature of the relative motion fluid is referred to the electrical means through said undisturbed fluid, and thermally conducting means carried by said body means to extend in such proximity to said electrical means, said undisturbed fluid and said relative motion fluid that flow variations of said relative motion fluid change the rate of heat transfer between said electrical means and relative motion fluid and through said undisturbed fluid and thermally conductive means.

2. Apparatus for sensing relative motion of a medium, comprising electrically energizable means having impedance that varies with temperature, body means immersible in said fluid medium under conditions such that the fluid medium has motion relative to said body means, said body means supporting said electrical means and including a thermally insulative body containing an outwardly and forwardly opening recess for holding substantially undisturbed fluid in such proximity to the relative motion fluid and to said electrical means within the interior of said recess that temperature of the relative motion fluid is referred to the electrical means through said undisturbed fluid, and thermally conductive means carried by said insulative body to extend in such proximity to said electrical means, said undisturbed fluid and said relative motion fluid that flow variations of said relative motion fluid change the rate of heat transfer between said electrical means and relative motion fluid and through said undisturbed fluid and thermally conductive means.

3. The invention as defined in claim 2 in which said electrically energizable means comprises a thermistor spaced from said thermally conductive means.

4. The invention as defined in claim 2 in which the recess length between the recess mouth and the location of said electrical means is sufficient that during said immersion conditions a pressure interface develops at a predetermined location in the recess to separate turbulent fluid forward of the shock wave from substantially undisturbed fluid rearward of the pressure interface, said thermally conductive means bridging said predetermined pressure interface location.

5. The invention as defined in claim 4 in which said thermally conductive means comprises a metallic liner for said recess.

6. The invention as defined in claim 5, including a heat conductive diaphragm in said recess for separating the undisturbed fluid from the relative motion fluid, said diaphragm being within said metallic liner.

7. A fluid flow meter assembly, comprising a pair of electrically interconnected thermistors and the resistances of which vary with temperature, body means immersible in a fluid medium under conditions such that the fluid medium has motion relative to said body means, said body means supporting said thermistors and including a thermally insulative body containing a pair of outwardly and forwardly opening recesses for holding substantially undisturbed fluid in such proximity to the relative motion fluid and to said thermistors within the interiors of said respective recesses that temperature of the relative motion fluid is referred to one thermistor through undisturbed fluid in one recess and to the other thermistor through undisturbed fluid in the other recess, and thermally conductive means carried by said insulative body to extend in such proximity to said one thermistor, said undisturbed fluid in said one recess and said relative motion fluid that flow variations of said relative motion fluid change the rate of heat transfer between said one thermistor and the relative motion fluid through the undisturbed fluid in said one recess and said thermally conductive means.

8. The invention as defined in claim 7 in which the recess lengths between the recess mouths and the thermistor locations are sufficient that during said immersion conditions pressure interfaces develop at predetermined locations in the recesses to separate turbulent fluid forward of each pressure interface from substantially undisturbed fluid rearward of the pressure interface, said thermally conductive means bridging said predetermined pressure interface location in said one recess.

9. The invention as defined in claim 7 in which said body contains port means communicating with the recess interior and openable to temporarily pass fluids rearwardly through the recesses.

10. The invention as defined in claim 7 in which said thermally conductive means comprises a metallic liner for said one recess, said liner being spaced from said one thermistor.

References Cited in the file of this patent
UNITED STATES PATENTS

| | | |
|---|---|---|
| 2,588,840 | Howland | Mar. 11, 1952 |
| 2,859,617 | Adams | Nov. 11, 1958 |
| 2,933,708 | Elliot et al. | Apr. 19, 1960 |
| 2,961,625 | Sion | Nov. 22, 1960 |